United States Patent

[11] 3,599,558

| [72] | Inventor | Allan R. Goldberg<br>Whiffletree Farm, North Stanwhich Road, Greenwich, Conn. 06830 |
|---|---|---|
| [21] | Appl. No. | 829,951 |
| [22] | Filed | June 3, 1969 |
| [45] | Patented | Aug. 17, 1971 |

[54] COOKING ACCESSORY
11 Claims, 1 Drawing Fig.

[52] U.S. Cl. .................................................... 99/339, 211/71
[51] Int. Cl. .................................................... A47j 43/00
[50] Field of Search........................................... 99/339, 291, 298, 367, 374, 416, 425, 448; 126/20, 20.1, 20.2, 25, 39 M, 369, 369.1, 369.2, 369.3; 211/71, 106, 119, 181; 220/19—20, 23.2, 23.4, 95

[56] References Cited
UNITED STATES PATENTS

| 2,772,627 | 12/1956 | Newell .......................... | 99/425 |
| 2,842,269 | 7/1958 | Gomersall ..................... | 211/71 |
| 3,082,757 | 3/1963 | Hohe............................. | 126/25 |
| 3,199,438 | 8/1965 | Myler et al..................... | 99/446 X |
| 3,211,082 | 10/1965 | Sachnoff et al. ............... | 99/444 X |

*Primary Examiner*—Walter A. Scheel
*Assistant Examiner*—Arthur O. Henderson
*Attorney*—Sherman and Shalloway

ABSTRACT: Disclosed herein is a cooking accessory including a rack having an open network of supporting ribs and at least three legs for spacing said ribs from the bottom of an oven, and a disposable broiler pan having a plurality of compartments defining a network of channels adapted to mate with the network of supporting ribs of said rack. Said broiler pan is constructed of lightweight inexpensive material to be thrown away after a single use and the supporting rack gives strength to the lightweight pan.

PATENTED AUG 17 1971
3,599,558
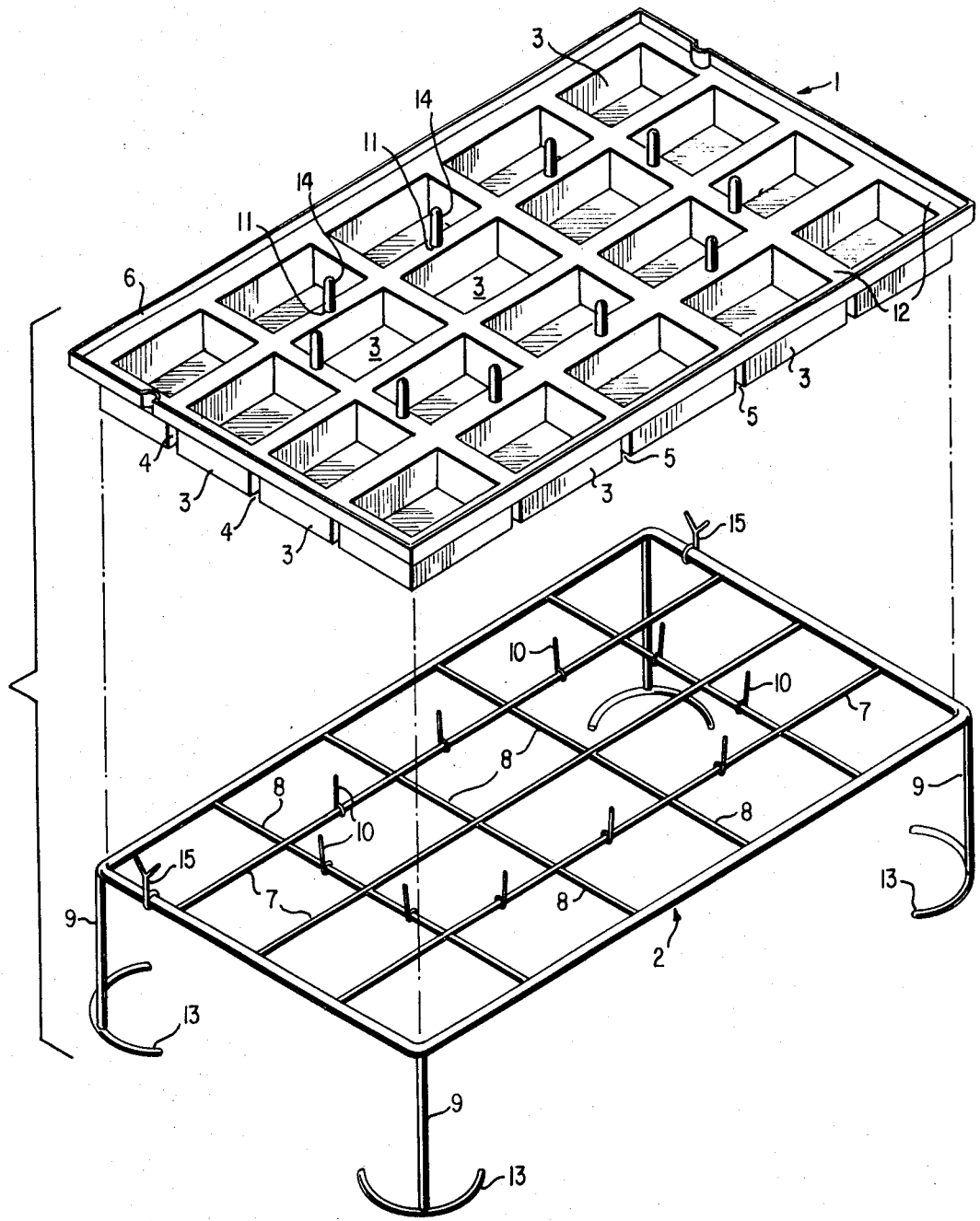
INVENTOR
ALLAN R. GOLDBERG
BY *Sherman & Shalloway*
ATTORNEY

COOKING ACCESSORY

This invention relates to a cooking accessory and, more particularly, to a disposable broiler pan which is provided with a supporting rack so that the disposable pan will not collapse under the weight of a large piece of meat, fish, fowl, etc., being cooked.

In the cooking art, it is commonplace to provide a broiler pan for an electric gas oven onto which is placed a cut of meat to be cooked. For some time now it has been a standard feature of stoves and household ovens to include a broiler pan on to which the meat to be cooked is placed. This broiler pan is usually of a strengthened material such as a stamped piece of sheet metal, tin, etc. These broiler pans space the cut of meat from the heat source and operate to catch the drippings and grease that is driven from the meat during the cooking process. These standard broiler pans are quite successful in accomplishing their intended purpose of catching the drippings from cooking meat, but, are attended by several inconveniences and disadvantages, primarily the inconvenience of cleaning the broiler pan after the cooking has been completed. Most of these broiler pans have an open grid work or some type of compartments that permit the drippings to accumulate while spacing the meat from the drippings. It is usually very inconvenient to clean these openings and the cleaning of the standard broiler pan oftentimes results in some cutting of the hands on the openings, or scratching or braising of the person doing the cleaning. Further, the work required to adequately clean the broiler pan is extensive and the time required for such cleaning is, in this day of leisure, preferably spent at more pleasant activities.

Understanding these difficulties with the earlier broiler pans provided with stoves and ovens, it has been proposed to provide a disposable broiler pan into which the meat is placed and which is provided with some type of rib structure to space the meat from compartments which are adapted to receive the drippings from the cooking meat. Such a disposable broiler pan is shown in U.S. Pat. No. Des. 177,360 and U.S. Patent No. 3,113,505. A drawback with this type of disposable broiler pan, however, is the fact that the lightweight material of which the pan must be made in order to make its use economically feasible does not provide sufficient support for a large piece of meat which would tend to crush the pan and have the meat fall or sag into the drippings which would otherwise be held in the compartments. The ultimate effect of this crushing of the pan is that the meat is braised rather than broiled because the meat settles in the juices held in the crushed pan.

These known disposable pans do have the advantage over the previous standard broiler pan provided with stoves in that these pans may be disposed of after one use and the inconveniences associated with the cleaning of a broiler pan are avoided.

The present invention overcomes the drawbacks as discussed above that are associated with the devices of the prior art by providing a disposable broiler pan and a supporting rack over which the broiler pan is placed so that the inconvenience of cleaning the broiler pan is avoided and the broiler pan is supported with sufficient rigidity to keep the meat from sagging into the compartments containing the drippings. In accordance with the present invention, a supporting rack is provided which includes a network of supporting ribs and legs for spacing the supporting ribs above the bottom of the oven. On this supporting rack is provided a disposable broiler pan, preferably of any desirable grade of aluminum foil, which has compartments for receiving the drippings from cooking meat and upstanding ribs which are supported by the ribs of the rack to carry the meat so that the meat will not sag into the drippings contained in the compartments.

Accordingly, it is a primary object of this invention to provide a cooking accessory in the form of a disposable broiler pan and a rack therefor to provide the disposable pan with sufficient rigidity to carry a heavy piece of meat to be cooked.

Yet another object of this invention is to provide a disposable broiler pan and rack of the type described wherein the broiler pan has an upstanding rim about its periphery for preventing any drippings from splattering or running outside the disposable pan.

It is still another object of this invention to provide a broiler pan and rack of the type described wherein said pan includes a plurality of compartments defining a network of channels which mate with the ribs of the supporting rack.

Another object of this invention is to provide a rack and disposable broiler pan, the pan constructed of any desired grade of aluminum foil.

Still another object of this invention is to provide a broiler pan and supporting rack of the type described wherein said pan includes a number of openings in the channels formed by the compartments and the rack includes a number of upstanding prongs adapted to project through said openings to thereby prevent shifting of fowl or meat disposed on the rack for cooking.

These and other objects of the invention will become readily apparent upon a consideration of the following detailed description of a preferred embodiment which is given by way of an example only and not intended to limit the scope of the invention beyond the terms of the appended claims, when taken in conjunction with the accompanying drawing wherein:

FIG. 1 is an exploded view of the disposable broiler pan and rack of this invention.

Referring now to FIG. 1, the disposable broiler pan of this invention is indicated generally at 1 and the rack is indicated generally at 2. The pan 1 includes a plurality of compartments 3 which are arranged to define a grid of channels 4 and 5. Channel 4 extends longitudinally through the broiler pan of the preferred embodiment and the channel 5 traverses the longitudinal channels 4 and communicates therewith. In effect, these compartments 3 and grid of channels 4 and 5 operate to define a raised section or raised portions 12 in the broiler pan which support the meat being cooked away from the drippings which accumulate in the compartments 3.

The broiler pan is also provided with a rim 6 extending around the periphery of the pan to assure that none of the drippings run over the side of the pan or spill to soil the oven. This preferred embodiment of the disposable broiler pan thus provides a cooking accessory which keeps the meat being cooked raised above the drippings while providing the convenience of assuring a clean oven after the cooking is completed without the usual time-consuming cleaning process which must follow the preparation of the meal with a standard broiler pan. Further, the rack will not need cleaning since the pan covers completely the rack and the pan being disposable, no cleanup is necessary as a result of the preparation of the meat course of the meal.

While trays similar to that above described have been provided for outside charcoal grills to avoid the necessity of having to clean the grill, for example, U.S. Pat. No. 3,082,757 granted to Hohe, it has not been proposed to Applicant's knowledge to provide such a disposable tray with a supporting structure for use in oven broiling, etc. as described herein.

A unique feature of this invention is the combination of a broiler pan as above described with a supporting rack so as to avoid the broiler pan crumpling under the weight of a large piece of meat which is being cooked. Such a supporting rack is indicated generally at 2 in the drawing and includes a number of longitudinally extending ribs 7 and traversing ribs 8. The ribs 7 and 8 are usually constructed of a strengthened wire or other material sufficiently rigid to support a large piece of meat to be cooked on the combination broiler pan and support. The rack 2 may be molded of any heat-resistant material, e.g., aluminum, to form one piece unitary structure. The network of ribs defined by the longitudinal and traversing ribs 7 and 8, respectively, are supported above the cooking surface of the oven by legs 9. Supporting the rack on legs as shown in the drawing is important in the fact that this provides an open supporting structure for the network of ribs forming the rack to permit the heat to reach the meat being cooked. A closed compartment supporting structure would be ineffective in the cooking process and the opened supporting structure is considered an essential feature of this invention.

Of course, the rack and pan can be of any convenient shape, e.g., rectangular, square, circular, etc. and the legs 9 may be provided with an arcuate base 13 to stabilize the structure and prevent the legs 9 from getting caught in any openings in the oven floor. Also, the arcuate base 13 permits, for example, in a circular rack, the use of only two legs 9 as a supporting structure.

As can be readily seen from the description of the preferred embodiment, when a large piece of meat is to be broiled, the present invention provides several advantages not found in the prior art. When the disposable broiler pan 1 is placed on the rack 2 the channels 4 and 5 form a network that overlay the ribs 7 and 8 of the rack and, thus, the compartments are spaced from the raised portions 12 to accumulate the drippings from the cooking meat. The meat is held on the raised portions 12 above the drippings collected in the compartments and the supporting structure embodied in the ribs 7 and 8 which are raised above the cooking surface by the legs 9 permit the disposable broiler pan to be used in cooking a large heavy piece of meat that would otherwise crush the lightweight pan and permit the meat to settle or sag into the drippings collected in the compartments. The open network supporting structure which is carried above the cooking surface by the legs 9 does not inhibit the cooking process and, thus, the cooking time would not be affected and the cook would not be required to make adjustments in the temperature of the oven, etc. when using the disposable broiler pan and supporting rack of this invention.

Another feature of this invention is the provision of prongs 10 connected to the ribs 7 and 8. These prongs 10 pass through openings or recesses 11 in the raised portions of the pan 1 to prevent shifting of the meat being cooked on the broiler pan. This feature of the invention is particularly desirable when fowl is being prepared since the contour of the fowl often causes it to shift during the cooking process. By providing the upstanding prongs 10 passing through the openings 11 in the pan 1, shifting of the fowl is avoided and, thus, the cook does not have to worry about the meat rolling off the broiler pan when the broiler pan is extended out of the oven for basting, inspection, etc. The disposable pan may be provided with integral sleeves 14 fitting over the prongs 10 so that none of the drippings will pass through the openings to soil the oven.

The rack 2 may be provided with standards 15 which will support a skewer or skewers for cooking shishkebob. These standards can be integrally formed with the rack and either extend through the disposable pan or the pan is preferably formed with offsets to accommodate the standards passing on the outside of the pan.

Having described a preferred embodiment of the invention, which is exemplary only and not intended to limit the scope of the invention beyond the terms of the appended claims, what is claimed is:

I claim:

1. A cooking accessory including in combination, a rack having a network of supporting ribs, a plurality of upstanding prongs projecting from said ribs, and an open supporting structure for spacing said ribs from the bottom of an oven, and a disposable broiler pan having a plurality of compartments defining a network of channels adapted to mate with the network of supporting ribs of said rack, said network of channels having a plurality of recesses therein for receiving said prongs.

2. A cooking accessory according to claim 1 wherein said recesses include protective sleeves into which the prongs project.

3. A cooking accessory comprising, in combination, a rack including a first plurality of supporting ribs, a second plurality of supporting ribs traversing said first plurality of supporting ribs, and an open support structure for spacing said first and second supporting ribs from the bottom of an oven; and a disposable broiler pan having a plurality of recessed compartments defining a first plurality of channels adapted to mate with said first plurality of supporting ribs and a second plurality of channels adapted to mate with said second plurality of supporting ribs.

4. A cooking accessory according to claim 3 wherein said pan is constructed of a lightweight, heat-resistant material.

5. A cooking accessory according to claim 4 wherein said material is aluminum foil.

6. A cooking accessory according to claim 3 wherein the support structure includes at least two legs with arcuate bases.

7. A cooking accessory according to claim 3 wherein the rack is constructed as a one-piece, unitary, molded member of any heat-resistant material.

8. A cooking accessory according to claim 7 wherein said material is aluminum.

9. A cooking accessory according to claim 3 wherein said first plurality of supporting ribs are disposed transversely of said second plurality of supporting ribs to define a plurality of open rectangular spaces, and said recessed compartments have a rectangular shape adapted to fit snugly in said spaces.

10. A cooking accessory according to claim 9 wherein said rack has a generally rectangular configuration and said support structure includes a leg at each corner of said rack having an arcuate base.

11. A cooking accessory including in combination, a rack having a network of supporting ribs, an open supporting structure for spacing said ribs from the bottom of an oven and standards posed at each end of said rack for holding a skewer and a disposable broiler pan having a plurality of compartments defining a network of channels adapted to mate with the network of supporting ribs of said rack.